June 19, 1962 R. B. DOME 3,040,261

SUPPRESSION OF HARMONICS IN DETECTION

Filed Jan. 22, 1957

INVENTOR.

ROBERT B. DOME,

BY Donald N. Timbie

HIS ATTORNEY.

3,040,261
SUPPRESSION OF HARMONICS IN DETECTION

Robert B. Dome, Geddes Township, Onondaga County, N.Y., assignor to General Electric Company, a corporation of New York Filed Jan. 22, 1957, Ser. No. 635,467
10 Claims. (Cl. 329—203)

This invention relates to a detector and detector circuits and particularly to detector circuits in which predetermined harmonics of the fundamental carrier frequency being supplied to the detector can be effectively suppressed in the output thereof.

Detectors are inherently non-linear devices. In addition to producing a useful D.C. output, detector outputs also contain components harmonically related to the exciting fundamental frequency. In certain instances the presence of these harmonic outputs is of no consequence. In other cases, the presence of one or more of the particular harmonic outputs is undesirable. For example, in a television receiver, the second detector detects a 45.75 megacycle picture carrier signal. The fourth harmonic output current resulting from detection of this picture carrier signal is 183 megacycles. This 183 megacycle signal falls within television channel No. 8 which is bounded by 180 megacycles and 186 megacycles. If the 183 megacycle output current from the second detector is fed back into the antenna or other input circuit, a "tweet" will be seen in the picture when the television receiver set is tuned to channel No. 8 as herringbone lines. The presence of this spurious herringbone pattern degrades the reception and is highly undesirable.

Many methods and devices have been used heretofore to overcome or minimize this result. For example, in certain instances the detector circuit is shielded so that little or none of the undesired harmonic output escapes into the antenna or input circuits. In other instances, the receiver is designed so that the detector is placed sufficiently far from the input circuits as to minimize introduction of harmonic outputs from the detector into the input circuits. Yet a third way to minimize such undesirable patterns is to add chokes and traps to the detector circuit to confine the undesired harmonic outputs to a particular portion of the chassis. In practice, any of these methods may be employed, or two or more may be employed simultaneously. These methods, in some instances, are not entirely effective and in instances where they are effective the measures taken are extremely costly and cumbersome.

Accordingly, it is an important object of the present invention to provide an improved detector circuit in which undesired harmonic outputs are more effectively suppressed and eliminated.

Yet another object of the invention is to provide a detector circuit in which certain predetermined harmonics can be selectively suppressed and eliminated in preference to other harmonic outputs from the detector circuit.

Yet another object of the invention is to provide relatively simple detector circuits which can be adjusted to eliminate undesirable harmonic outputs from the detector during operation thereof.

Still another object of the invention is to provide an improved method of suppressing and eliminating undesirable harmonic outputs during the operation of detector circuits.

A further object of the invention is to provide improved detector circuits which suppress and eliminate undesired harmonic outputs with a minimum of loss of the desired output.

These and other objects and advantages of the invention will be better understood from the following description when taken in conjunction with the accompanying drawing. In the drawing wherein like reference numerals have been utilized to designate like parts throughout:

Figure 1:
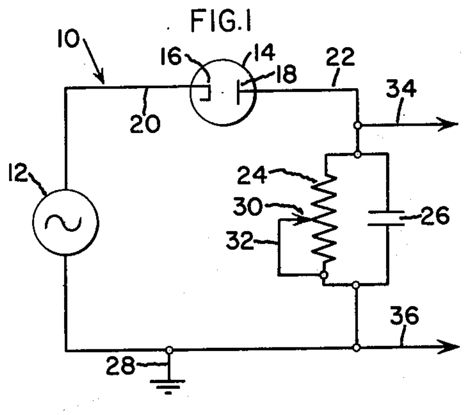
FIGURE 1 is a schematic electrical diagram of a detector circuit made in accordance with and embodying the principles of the present invention.

Referring to FIGURE 1 of the drawing there is shown a typical detector circuit generally designated by the numeral 10. The circuit 10 includes a source 12 of oscillations which are essentially sinusoidal in character and which have impressed thereon intelligence which is to be detected and separated by means of detector circuit 10. In circuit with source 12 is detector member in the form of a diode 14 including a cathode 16 and a plate 18. The cathode 16 is connected to one terminal of the source 12 through a line 20. Plate 18 is connected through a line 22 to a resistance 24 and a capacitance 26 connected in parallel with resistance 24. The other terminal of source 12 and the other ends of resistance 24 and capacitance 26 are connected and may be in turn connected to any suitable reference point such as ground 28. Resistance 24 is made adjustable by providing a contact 30 connected by means of a line 32 to ground 28. It will be seen that resistance 24 is in the form of a rheostat, contact 30 and line 32 serving to cut out or eliminate any desired portion of resistance 24 from the circuit. The output from the detector circuit is taken across resistance 24 and capacitance 26 between lines 34 and 36.

The operation of detector circuit 10 can be analyzed as follows. Capacitance 26 is sufficiently large that no appreciable radio frequency ripple occurs across the terminals thereof. For purpose of simplicity it will be assumed that the diode 14 has a finite internal resistance in the conducting direction and an infinite internal resistance in the non-conducting direction. The current flow through tube 14 under the above conditions is shown graphically in FIGURE 4 of the drawing. More specifically, the current flow is represented by the heavy continuous line and comprises portions of the sine wave input. For purposes of analysis, the full sine wave is shown dotted in and has been illustrated as oscillating about an axis designated AB. Axis AB is positioned below the zero conduction line designated OD.

Figure 4:
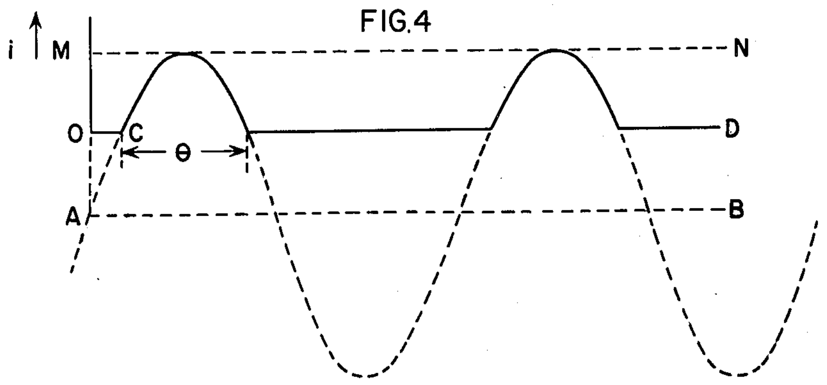
FIGURE 4 is a diagram illustrating the output of a typical detector including the detectors of the present invention and the relation of the output to the exciting fundamental frequency.

From FIGURE 4 it can be seen that the operation of detector circuit 10 is inherently non-linear and thereby gives rise to harmonics in the output taken across the lines 34—36. The harmonics generated in circuit 10 are multiples of the fundamental frequency represented by the dotted sine wave illustrated in FIGURE 4 and oscillating about the axis AB. It can be demonstrated that the harmonics generated in operation of circuit 10 are related to the angular displacement across the base of the portion of the sine wave appearing in the output along axis OD. This angular displacement is referred to as the "open angle" and will hereafter be designated as angle $\theta$.

The coefficient of the $n$th harmonic of the input sine wave (indicated by the letter "$z$") and the open angle $\theta$ are related as indicated in the following mathematical equation:

$$z=\frac{\sin (n+1)\frac{\theta}{2}}{n+1}+\frac{\sin (n-1)\frac{\theta}{2}}{n-1}-\frac{2 \sin n\frac{\theta}{2}\cos \frac{\theta}{2}}{n} \quad (1)$$

The above equation can be simplified by substituting for the last term thereof the trigonometric equivalent from the general expression:

$$\sin x \cos y = \tfrac{1}{2} \sin (x-y) + \tfrac{1}{2} \sin (x+y) \qquad (2)$$

Combining Equations 1 and2, a simplified expression for the coefficient $z$ can be obtained as follows:

$$z = \frac{\sin (n-1)\frac{\theta}{2}}{n(n-1)} - \frac{\sin (n+1)\frac{\theta}{2}}{n(n+1)} \qquad (3)$$

If it is desired to suppress or eliminate a particular $n$th harmonic, it is necessary that the coefficient "$z$" be reduced to zero. This can be accomplished by adjusting the open angle $\theta$ so that Equation 3 is equal to zero for the desired $n$th harmonic. By adjusting the circuit 10 to obtain this desired open angle $\theta$ in operation, that particular harmonic will be suppressed or eliminated. Applying this principle to Equation 3, i.e., making "$z$" equal zero, a new equation showing the interrelation between the $n$th harmonic and the angle $\theta$ would be written as follows:

$$\frac{\sin (n-1)\frac{\theta}{2}}{n-1} - \frac{\sin (n+1)\frac{\theta}{2}}{n+1} = 0 \qquad (4)$$

By way of illustration, the open angle $\theta$ at which the second harmonic will be suppressed in operation of circuit 10 can be calculated from Equation 4 by substituting $n=2$ therein, whereby to obtain equation:

$$\sin \frac{\theta}{2} - \frac{\sin 3\frac{\theta}{2}}{3} = 0 \qquad (5)$$

By inspection, it can be seen that Equation 5 would be true only if $\theta$ is zero or 360°. Accordingly, the second harmonic input sine wave will be suppressed if the open angle $\theta$ is adjusted to zero or 360°.

If it is desired to suppress the third harmonic, Equation 4 must have the number 3 substituted for $n$ therein, whereby to give the following equation:

$$\frac{\sin \theta}{2} - \frac{\sin 2\theta}{4} = 0 \qquad (6)$$

It will be seen that there are three values of $\theta$ for which Equation 6 above is valid. These values are 0°, 180° and 360°. The third harmonic, therefore, will be suppressed if the open angle $\theta$ is adjusted to any of these three values.

It is to be noted from the above examples that the number of angles at which a particular $n$th harmonic is suppressed is equal to the value of the $n$th harmonic. For the 2nd harmonic there are two such angles and for the 3rd harmonic there are three such angles. It can be demonstrated that this is true for the $n$th harmonic. The following is a table listing open angles at which harmonics will be suppressed through the 10th harmonic:

| $n$ | $\theta_1$ | $\theta_2$ | $\theta_3$ | $\theta_4$ | $\theta_5$ | $\theta_6$ |
|---|---|---|---|---|---|---|
| 1 | 0° | | | | | |
| 2 | 0° | 360° 0′ | | | | |
| 3 | 0° | 180° 0′ | 360° 0′ | | | |
| 4 | 0° | 131° 49′ | 228° 11′ | 360° 0′ | | |
| 5 | 0° | 104° 28′ | 180° 0′ | 255° 32′ | 360° 0′ | |
| 6 | 0° | 86° 40′ | 149° 7′ | 210° 53′ | 273° 20′ | 360° 0′ |
| 7 | 0° | 74° 5′ | 127° 25′ | 180° 0′ | 232° 35′ | 285° 55′ |
| 8 | 0° | 64° 42′ | 111° 17′ | 157° 8′ | 202° 52′ | 248° 43′ |
| 9 | 0° | 57° 27′ | 98° 47′ | 139° 29′ | 180° 0′ | 220° 31′ |
| 10 | 0° | 51° 37′ | 88° 50′ | 125° 25′ | 161° 49′ | 198° 11′ |

| $n$ | $\theta_7$ | $\theta_8$ | $\theta_9$ | $\theta_{10}$ |
|---|---|---|---|---|
| 1 | | | | |
| 2 | | | | |
| 3 | | | | |
| 4 | | | | |
| 5 | | | | |
| 6 | | | | |
| 7 | 360° 0′ | | | |
| 8 | 295° 18′ | 360° 0′ | | |
| 9 | 261° 13′ | 302° 33′ | 360° 0′ | |
| 10 | 234° 35′ | 271° 10′ | 308° 23′ | 360° |

In the above table $n$ is the harmonic number, $\theta_1$ is the first open angle at which the harmonic is suppressed, $\theta_2$ is the second open angle at which the harmonic is suppressed, etc. From this table, the open angle or open angles of conduction which yield zero harmonic amplitude for the $n$th harmonic of the input sine wave through the 10th harmonic can be ascertained.

The angle of conduction or the open angle can be measured directly by means of an oscilloscope if the frequency of the exciting sine wave in the generator 12 is sufficiently low to give a good picture on the cathode-ray tube. An indirect method of measuring the open angle is to measure the detector efficiency. The open angle and the detector efficiency are interrelated and this can be demonstrated as follows:

$$\eta = \frac{\text{D.C. axis shift}}{\text{peak A.C. component}} = \frac{OA}{MA} \qquad (7)$$

wherein, $\eta$ is the detector efficiency, OA is the amount that the zero voltage at output terminals 34 and 36 is shifted above the axis about which the exciting sine wave oscillates, as illustrated in FIGURE 4, and MA is the peak voltage of the exciting sine wave as illustrated in FIGURE 4.

The D.C. axis shift and the peak A.C. component are related to the angle $\beta$ (the angular displacement OC along the axis OD of FIGURE 4) as follows:

$$\beta = \sin^{-1}\frac{E_{dc}}{E_{peak}} = \sin^{-1}\frac{OA}{MA} \qquad (8)$$

The angles $\beta$ and $\theta$ are related as follows:

$$\beta = 90° - \frac{\theta}{2} \qquad (9)$$

Combining Equations 7, 8 and 9:

$$\theta = 180° - 2 \sin^{-1}\frac{E_{dc}}{E_{peak}} = 180° - 2 \sin^{-1} \eta \qquad (10)$$

Solving Equation 10 for $\eta$, the relation of the detector efficiency to the open angle is:

$$\eta = \sin\left(90° - \frac{\theta}{2}\right) \qquad (11)$$

From the above it can be seen that the angle of conduction or the open angle $\theta$ can be determined by electrical measurement of the detector efficiency $\eta$. Conversely, if a particular open angle $\theta$ is desired, the detector circuit 10 need only be adjusted for an indicated efficiency in order to obtain that angle. The value of $\theta$ for adjustment of circuit 10 is one which will suppress a particular harmonic and such adjustment of circuit 10 will be effective to suppress that harmonic.

By way of example, the 10th harmonic can be suppressed by using any of the ten angles found in the above table. The practical angle and that giving the highest efficiency is $\theta_2$ or 51° 37′. Substituting this value of $\theta$ into Equation 11, it can be shown that the detector efficiency must be 0.90025. Adjustment of detector circuit 10 to achieve this efficiency will serve to suppress the 10th harmonic of the exciting sine wave from generator 12.

The desired open angle $\theta$ can also be predetermined by choosing an adjusting the ratio of the internal plate resistance of diode 14 to the D.C. load resistance 24 in FIGURE 1. The relationship between the internal plate resistance of diode 14, the load resistance 24 and the open angle $\theta$ can be expressed as follows:

$$\frac{r_p}{R_{dc}}=\frac{2\cot\beta-(\pi-2\beta)}{2\pi}=\frac{\left[2\tan\frac{\theta}{2}\right]-\theta^r}{2\pi} \quad (12)$$

wherein:

$r_p$ is the internal cathode to plate resistance of diode 14;

$R_{dc}$ is the D.C. resistance of resistance 24;

$\beta$ is the angle defined in Equations 8 and 9; and $\theta^r$ is the open angle $\theta$ expressed in radians.

Equation 12 can be written to express $\theta$ in degrees as follows:

$$\frac{r_p}{R_{dc}}=\frac{\left[2\tan\frac{\theta}{2}\right]-\frac{\pi\theta^\circ}{180}}{2\pi} \quad (13)$$

From Equation 13 it is possible to calculate the ratio of the internal plate resistance to the D.C. load resistance necessary to obtain desired detector efficiency or a desired open angle whereby to suppress a particular harmonic of the exciting sine wave. Continuing the example given above, wherein it was desired to suppress the 10th harmonic, the value of 51° 37′ is substituted as the value of $\theta$ in Equation 13. This gives a ratio of plate resistance of diode 14 to the D.C. resistance of load resistor 24 of 0.0104 to suppress the 10th harmonic.

In a typical installation, the internal plate resistance of diode 14 is 200 ohms. The load resistor 24 should then be chosen and adjusted to have a value of 19,200 ohms in order to suppress the 10th harmonic. This value of resistance 24 can be readily achieved by moving slider 30.

Figure 2:
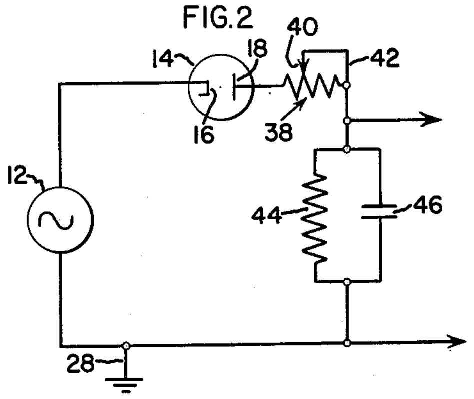
FIGURE 2 is an electrical schematic diagram of an embodiment of a detector circuit made in accordance with the present invention.

There is shown in FIGURE 2 of the drawing a circuit whereby a resistance in series with the internal plate resistance of the diode can be adjusted instead of adjusting the D.C. output load resistance. In this form of the invention, the generator 12 and the diode 14 are connected in circuit as described above. The plate 18 of diode 14 is connected to a resistance in the form of a rheostat 38. Rheostat 38 has a contact 40 thereon connected to a lead 42 attached to one end of the resistance whereby to short-circuit a portion of the resistance to decrease the effective circuit resistance. Rheostat 38 is also connected to a resistance 44 which is provided with a capacitance 46 in parallel therewith. The other ends of resistance 44 and capacitance 46 are connected to the ground 28.

By adjusting rheostat 38, the effective internal resistance of diode 14 (which, for the purpose of this specification and the accompanying claims, is the sum of its inherent internal resistance and that part of resistor 38 remaining actively in the circuit) can be changed thereby in turn changing the open angle of operation of the detector circuit. Adjustment of rheostat 38 may be made as has been explained above.

A circuit such as that of FIGURE 2 can be used to suppress a harmonic with a minimum of attenuation of the output. In a typical installation, a crystal diode was used in place of diode 14, the crystal diode having an internal resistance of approximately 540 ohms. The load resistance 44 had a value of 3900 ohms. It was desired to suppress the 4th harmonic of the picture intermediate frequency of 45.75 megacycles. This 4th harmonic interferes with reception of channel 8 which is bounded by 180 megacycles and 186 megacycles. Utilizing the above table and Equation 13, it is determined that the ratio of diode plate resistance to output resistance should be 0.348. From this it is calculated that the total effective diode plate resistance required is 1360 ohms. Accordingly, a rheostat 38 is inserted in series with the diode plate and adjusted to a value of 820 ohms since $$1360-540=820$$

This circuit substantially suppressed the undesired 4th harmonic of the 45.75 megacycle picture intermediate frequency. It further was determined that the addition of the harmonic suppresson circuit diode added only 2 db attenuation to the receiver sensitivity.

Figure 3:
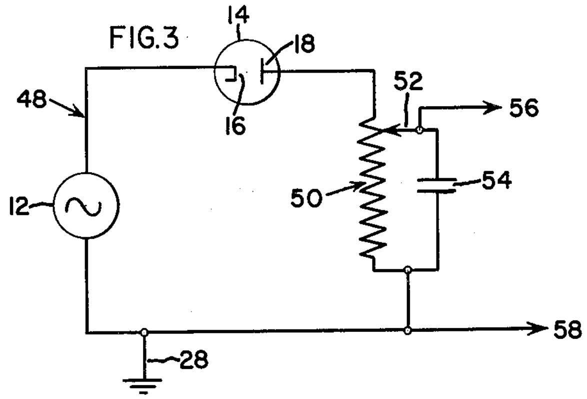
FIGURE 3 is a schematic diagram of a third embodiment of a detector circuit made in accordance with the present invention.

There is shown in FIGURE 3 of the drawing a third form of the invention embodied in a detector circuit generally designated by the numeral 48. In circuit 48 the effective internal plate resistance of the diode which as defined above consists of the inherent internal resistance of the diode and that part of resistor 50 remaining actively in the circuit and the D.C. load resistance can be simultaneously adjusted. Generator 12 is connected in circuit with the diode 14 in the same manner as in FIGURES 1 and 2. Plate 18 of diode 14 is connected to one end of a resistance 50. The other end of resistance 50 is connected to ground. A sliding contact 52 is provided to make contact at various points along resistance 50. Contact 52 is also connected to one end of a capacitance 54. The other end of capacitance 54 is connected to ground 28. The output is taken from terminals 56 and 58, terminal 56 being connected to slider 52 and terminal 58 being connected to ground 28. The portion of resistance 50 appearing between contact 52 and plate 18 forms a part of the diode effective internal plate resistance and the portion of resistance 50 disposed between contact 52 and ground 28 serves as the D.C. load resistance. Movement of contact 52 simultaneously changes both the diode effective internal plate resistance and the load resistance.

It is to be understood that the generator 12 may comprise or include an antenna, amplification circuits, and other input circuits which provide a source of sinusoidal waves which it is desired to put into the various detector circuits. Other rectifying and detecting elements other than the high vacuum thermionic diode 14 can be used. For example, the so-called "crystal diodes" can be successfully utilized in the present invention.

Very accurate settings of the adjustments, such as the adjustment of contact 30 on resistance 24, the adjustment of contact 40 on rheostat 38, and adjustment of contact 52 on resistance 50 can be obtained in another manner. A separate radio receiver is provided and tuned to the harmonic which it is desired to suppress. The diode of the detector circuit is connected as the input to the radio receiver and the detector circuit is adjusted to give minimum output from the separate receiver.

In all practical cases there will be a plurality of angles of conduction or open angles at which the detecting circuit can be operated to suppress the unwanted harmonic. Certain of the open angles that could be chosen are more desirable than others because certain of the angles give less attenuation or a greater efficiency than others. Accordingly, the detecting circuit is adjusted to operate at an open angle at which the attenuation is a minimum or the detector efficiency is a maximum.

In the field of commercial television broadcasting and reception, the circuits of the present invention have a very definite value. As has been explained above, the second detector in commercial television receiving sets detects 45.75 megacycle picture carrier signal. The 4th harmonic of this carrier signal has heretofore been generated in operation of the second detector to produce a 183 megacycle interference signal. This interference signal appears as a tweet or herringbone lines in the picture when the receiver is tuned to receive television channel 8, which is bounded by 180 megacycles and 186 megacycles. By the present invention this undesirable interference signal can be substantially eliminated by preventing its production in the picture second detector. This, therefore, eliminates the need for special shielding, uneconomical design and parts placement, and other expensive and inconvenient methods of preventing entry of the 183 megacycle interference signal into the input circuits.

Another important specific application of the present invention in commercial television receiving sets is in connection with the sound detector. The sound detector operates at 4.5 megacycles. The 10th harmonic in this signal appears as a 4.5 megacycle tweet in the I.F. passband of the receiver. Using the present invention, operation of the second detector can be adjusted whereby to suppress or eliminate production of this 10th harmonic in the sound detector. Elimination of the 10th harmonic renders unnecessary the use of complicated and expensive shielding or special arrangement of the circuit components. Suppression of the 10th harmonic is achieved with only a slight added attenuation over-all in the receiver.

Although certain preferred embodiments of the invention have been shown by way of illustration, it is to be understood that various changes and modifications can be made therein without departing from the spirit and scope of the invention. Accordingly, the invention is to be limited only as set forth in the following claims.

What I claim as new and desire to secure by Letters Patent of the United States is:

1. In an amplitude modulation detection circuit having an amplitude modulated input carrier signal of frequency $f_s$, the means for suppressing an undesired harmonic component of order $n$ of said input carrier signal comprising: a source of amplitude modulated carrier signal of frequency $f_s$, a detector element having an effective internal resistance $r_p$, a load resistance $R_{DC}$, a capacitance, means interconnecting said signal source, said detector element, said load resistance, and said capacitance for providing amplitude modulation detection of said signal, said resistances $r_p$ and $R_{DC}$ having values of resistance selected for suppressing an undesired harmonic component $nf_s$ of said carrier signal frequency.

2. In an amplitude modulation detector circuit wherein an undesirable component of harmonic order $n$ of an amplitude modulated input carrier signal having a fundamental frequency $f_s$ is suppressed when the detector circuit has a corresponding angle of conduction $\theta_n$, a means for suppressing the undesired harmonic component $nf_s$ of the carrier signal comprising: a source of amplitude modulated carrier signal of frequency $f_s$, a detector element having an effective internal resistance $r_p$, a load resistance $R_{DC}$, a capacitance, means interconnecting said signal source, said detector element, said load resistance and said capacitance for providing amplitude modulation detection of said signal, said resistances $r_p$ and $R_{DC}$ having values of resistance selected to provide an angle of conduction $\theta_n$ for suppressing the harmonic component $nf_s$ of the carrier frequency.

3. The apparatus of claim 2 wherein the ratio of said resistance $r_p$ and $R_{DC}$ satisfy the relation:

$$\frac{r_p}{R_{DC}}=\frac{\left[2\tan\frac{\theta_n}{2}\right]-\frac{\theta_n}{180}}{2}$$

where $r_p$ and $R_{DC}$ are expressed in ohms and $\theta_n$ is expressed in degrees.

4. The apparatus of claim 2 wherein said effective internal resistance consists of the internal plate resistance of said detector element.

5. The apparatus of claim 4 wherein said load resistance, $R_{DC}$, comprises an adjustable resistance.

6. The apparatus of claim 2 wherein said load resistance $R_{DC}$ comprises a load resistor having a single value of resistance, said capacitance is connected in parallel with said load resistor and said effective internal resistance $r_p$ includes a resistance connected serially with said detector element, said series connected resistor conducting current of input carrier frequency $f_s$.

7. The apparatus of claim 2 wherein said load resistance $R_{DC}$ comprises a load resistor having a single value of resistance, said capacitance is connected in parallel with said load resistor and means are provided for varying the effective internal resistance $r_p$.

8. The apparatus of claim 7 wherein said means for varying the effective internal resistance $r_p$ comprises an adjustable resistance serially connected with said detector element and conducting current of input carrier frequency $f_s$.

9. The apparatus of claim 2 including means for simultaneously varying said effective internal resistance $r_p$ and said load resistance $R_{DC}$.

10. The apparatus of claim 9 wherein said means for simultaneously varying said effective internal resistance $r_p$ and said load resistance $R_{DC}$ comprises a potentiometer having first and second terminals and an adjustable sliding contact, said detector element includes an electrode coupled to said first potentiometer terminal, and said capacitance is connected intermediate said adjustable contact and said second potentiometer terminal.

References Cited in the file of this patent

UNITED STATES PATENTS

| | | |
|---|---|---|
| 1,477,017 | Sprague | Dec. 11, 1923 |
| 2,329,877 | Cawein | Sept. 21, 1943 |

OTHER REFERENCES

Cocking: "The Diode Detector," Wireless World, Jan. 27, 1938, pp. 74–76.

Seely Electron Tube Circuits, 2nd edition, 1958, pp. 578–583.